United States Patent [19]
Okamoto et al.

[11] Patent Number: 5,949,209
[45] Date of Patent: Sep. 7, 1999

[54] EXPLOSION-PROOF PAINTING ROBOT

[75] Inventors: Hitoshi Okamoto; Naritoshi Nakamura, both of Toyama-ken, Japan

[73] Assignee: Nachi-Fujikoshi Corp., Toyama, Japan

[21] Appl. No.: 08/924,704

[22] Filed: Sep. 5, 1997

[30] Foreign Application Priority Data

Sep. 11, 1996 [JP] Japan ................................. 8-261179

[51] Int. Cl.⁶ .............................. G05B 9/02; B25J 11/00
[52] U.S. Cl. .............. 318/563; 318/568.11; 318/568.24; 174/17 GF; 74/490.03; 901/23; 901/43; 901/49
[58] Field of Search ................................. 318/560–579; 118/669, 300, 323; 239/722, 750–753, 263.1, DIG. 14; 174/11 R, 14 R, 17 GF; 74/490.01, 490.02, 490.03, 490.07; 901/1, 2, 9, 23, 24, 43, 49

[56] References Cited

U.S. PATENT DOCUMENTS

| | | | |
|---|---|---|---|
| 4,613,082 | 9/1986 | Gimple et al. | 239/690 |
| 4,614,164 | 9/1986 | Kato et al. | 118/323 |
| 4,698,568 | 10/1987 | Nishizawa et al. | 318/481 |
| 4,716,785 | 1/1988 | Godai et al. | 74/640 |
| 4,785,653 | 11/1988 | Danielsson | 72/249 |
| 4,957,060 | 9/1990 | Cann | 118/699 |
| 4,984,745 | 1/1991 | Akeel et al. | |
| 5,065,062 | 11/1991 | Uehara et al. | 310/114 |
| 5,146,105 | 9/1992 | Obata et al. | 307/118 |
| 5,212,432 | 5/1993 | Ohtani et al. | |
| 5,248,341 | 9/1993 | Berry, Jr. et al | 118/698 |
| 5,421,218 | 6/1995 | Akeel et al. | |
| 5,440,916 | 8/1995 | Stone et al. | 73/23.31 |

Primary Examiner—Brian Sircus
Attorney, Agent, or Firm—Venable; Robert J. Frank

[57] ABSTRACT

An electrically driven explosion-proof painting robot comprises a base having a first pressurized chamber, a rotary base having a second pressurized chamber, an inner arm having a third pressurized chamber and an outer arm having a fourth pressurized chamber. Each pressurized chamber is hermetically sealed and independently formed, can contain an electric motor connected with cables and is not in fluid communication with one another. Each pressurized chamber is supplied with pressurized air respectively by respective air pipes extending through the respective walls of the chambers. Each air pipe is made detectable its pressure respectively. An explosion-proof cable bundle housing cables and is shielded by a steel tube extend from the robot controller to the wall of the first pressurized chamber and from the first pressurized chamber other explosion-proof cable bundles extend in between the rest chambers through the respective walls of the rest chambers, to feed electric powers into the motors contained therein.

9 Claims, 6 Drawing Sheets

EXPLOSION-PROOF PAINTING ROBOT

BACKGROUND OF THE INVENTION

1. Field of the Invention

The present invention relates to an electrically driven explosion-proof painting robot for use in a painting booth having an environment containing inflammable gases, in particular, the robot has pressurized chambers which may contain ignitable electric motors, cables and other electric equipments.

2. Description of Related Art

U.S. Pat. No. 4,984,745 and 5,421,218 disclose an electrically driven explosion-proof painting robot having pressurized chambers which are in fluid communication with one another and may contain ignitable electric motors and cables, therein. Non-explosion-proof cables housed in a shielding steel air pipe and supplied with pressurized air, supply electric power to the robot motors. U.S. Pat. No. 5,212,432 discloses an electrically driven explosion-proof painting robot having explosion-proof containers containing hollow electric motors. The motor containers are supplied with pressurized air independently via respective input ports and purged via respective output ports through respective pressurized hoses. Further, the '432 patent proposes a robot which houses these hoses inside the robot.

However, in the '745 and '218 patents, the cables extending via an opening between the neighboring pressurized chambers are likely to be affected by abrupt bendings and twistings in a short portion around the opening arising out of relative movement of the neighboring chambers which may damage the cables. Further, it also may take a long time to purge gases or air from all pressurized chambers, and when any one of the pressurized chambers leaks, it may not be possible to detect at once the chamber which has leaked. Further; supply of air pressure to the pressurized chambers drops, it may take too long a time to purge air from the pressurized chambers. In the '432 patent, the hollow electric motors are expensive and the respective pressurized supplying and purging hoses are exposed outside the robot body. Consequently additional installation floor space is required and friction between the exposed hoses and operating robot arms or painting apparatuses is liable to cause damage to the hoses. Further, the robot which houses these hoses inside the robot has a drawback in that it may damage the hoses through friction therebetween.

SUMMARY OF THE INVENTION

It is therefore an object of the present invention to provide an electrically driven explosion-proof painting robot wherein the cables extending between the pressurized chambers are not likely to be effected abrupt bendings and twistings thereby eliminating a damage of the cables, further, purging gases or airs in all pressurized chambers can be made in a shorter time.

It is another object of the present invention to provide an electrically driven explosion-proof painting robot wherein it is possible to detect a leaked pressurized chamber at once when it caused a leakage, further, when the supply air pressure to the pressurized chambers drop, it is possible to detect it to take necessary measures.

It is further object of the present invention to provide an electrically driven explosion-proof painting robot wherein respective pressurized horses and purging horses are substantially not exposed outside the robot body and are not made liable to be damaged through friction between the exposed horses and operating robot arms or painting apparatuses.

According to the present invention, there is provided an electrically driven explosion-proof painting robot comprising a base having a first pressurized chamber, a rotary base supported rotatably relative to the base around a vertical axis and having a second pressurized chamber, an inner arm the lower end of which is supported rotatably relative to the rotary base around a first horizontal axis and having a third pressurized chamber, and an outer arm one end of which is supported rotatably relative to the inner arm around a second horizontal axis and having a fourth pressurized chamber. Each pressurized chamber is hermetically sealed and independently formed and not in fluid communication with one another, can contain an electric motor connected with cables. The first pressurized chamber is supplied with a pressurized air via an air pipe connected to a manifold disposed therein having one output port communicating therewith, and then from the manifold three divided pressurized air pipes extend through the wall of the first pressurized chamber into a hazardous environment and from there, respectively extends into the second, third and fourth chambers through the respective walls of the second, third and fourth chambers, to feed pressurized airs into the chambers respectively. Each air pipe do not contain cables and the air pressures and purge air flow rates of the respective pressurized chambers are made detectable respectively. An explosion-proof cable bundle housing cables and is shielded by a steel tube the inside of the steel tube is injected with sealing material to prevent the entry of the air, and is not supplied with pressurized air extend from the robot controller to the wall of the first pressurized chamber and from the first pressurized chamber other explosion-proof cable bundles extend in between the second, third and fourth chambers through the respective walls of the chambers, to feed electric powers into the motors contained therein.

By such an arrangement, since respective explosion-proof cable bundles are supported by each partition walls through joints attached thereto, the robot of the present invention is possible that the cables extending via an opening between the neighboring pressurized chambers are not made likely to be effected abrupt bendings and twistings in a short portion around the opening between the neighboring chambers arising out of relative movement thereof resulting that it eliminates a damage of the cables, further, since each pressurized chamber is supplied with pressurized air respectively, each chamber is possible to be supplied with pressurized air quickly so that the robot can be started faster, moreover, since the four pressure switches detect a leakage in the four pressurized chambers respectively, it is possible to detect a leakage in any one of the pressurized chambers at once when it caused the leakage, further, when the supply air pressure to the pressurized chambers drops, the purge air flow rates detect it to take necessary measures. And further, since the explosion-proof cable bundles and air pipes are very little or substantially not exposed outside the robot body resulting that they are not made liable to be damaged through friction between the exposed horses and operating robot arms or painting apparatuses thereby a longer life of the robot can be attained.

DETAILED DESCRIPTION OF THE PREFERRED EMBODIMENTS

Figure 1A:
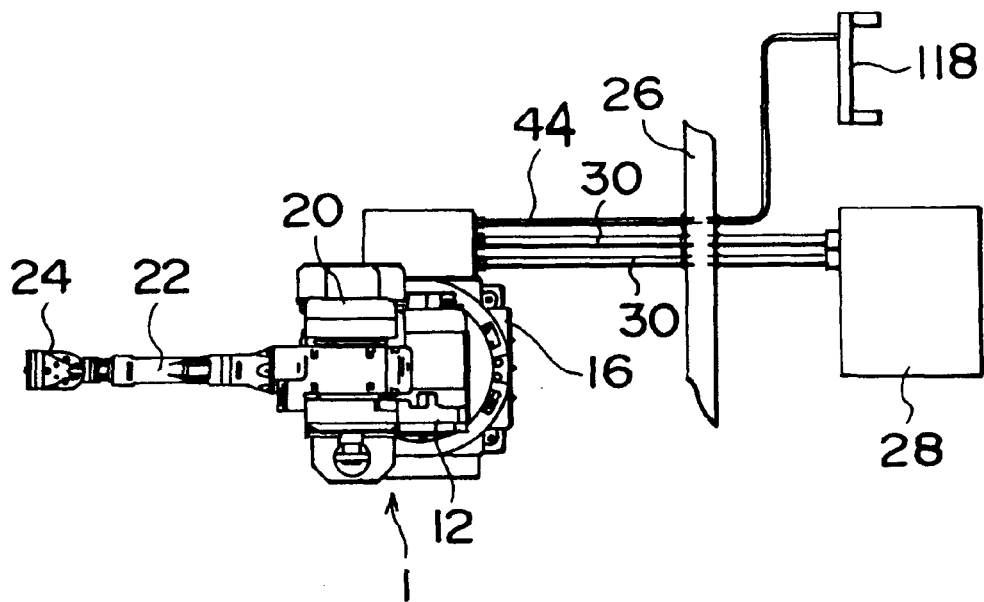
FIG. 1(*a*) is a general plan view showing the entire explosion-proof robot, and FIG. 1(*b*) is a side view of FIG. 1(*a*).
Figure 1B:
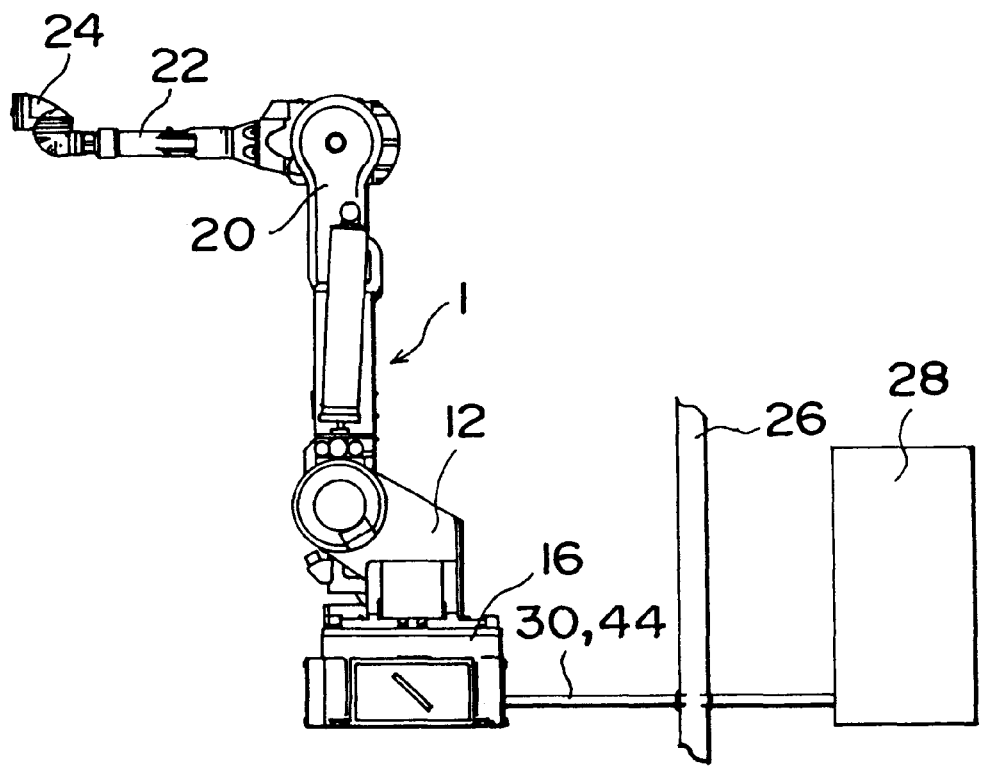
Figure 2A:
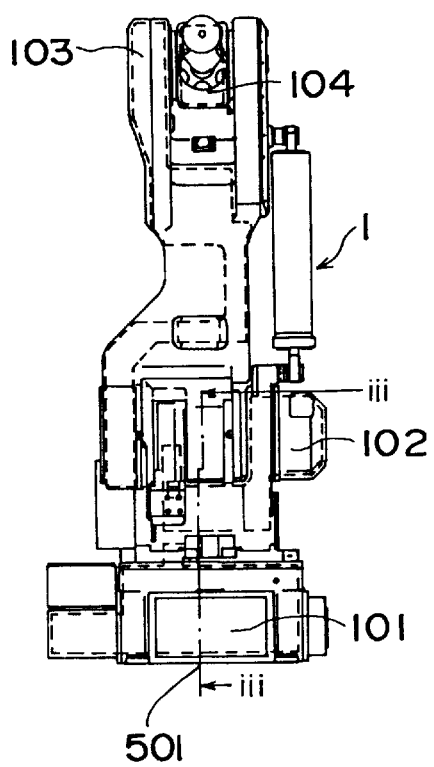
FIG. 2(*a*) is a front elevational view of the robot showing each pressurized chambers in dashed lines, and FIG. 2(*b*) is a side view of FIG. 2(*a*).
Figure 2B:
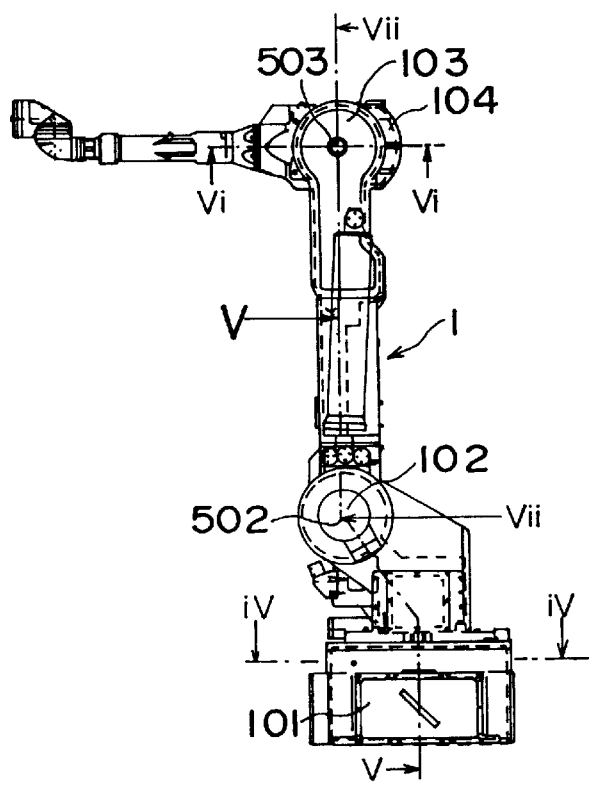
Figure 3:
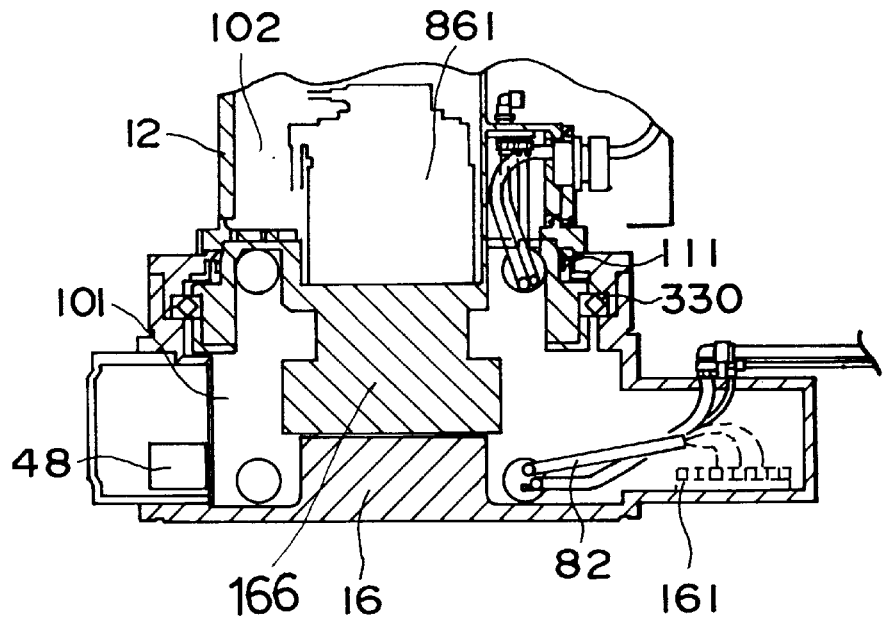
FIG. 3 is an enlarged cross-sectional view taken along line iii—iii of FIG. 2(*a*).

This invention will be described in further detail by way of example with reference to the attached drawings. As shown in FIGS. 1(a), 1(b), 2(a) and 2(b) an electrically driven explosion-proof painting robot 1 is installed in a painting booth having a hazardous environment or an environment containing inflammable gases in an area divided by an explosion-proof wall 26. A robot controller 28 and an air unit 118 are located in an area having a non-hazardous environment or an environment not containing inflammable gases. An explosion-proof cable bundle 30 extends from the robot controller 28 through the wall 26 to the wall of the robot 1. An air pipe 44 made of nylon, the inside of which does not house cables extends from the air unit 118 through the wall 26 to the robot 1 and supplies pressurized air to the robot 1. The robot 1 is controlled by the robot controller 28 through the explosion-proof cable bundle 30.

Figure 5:
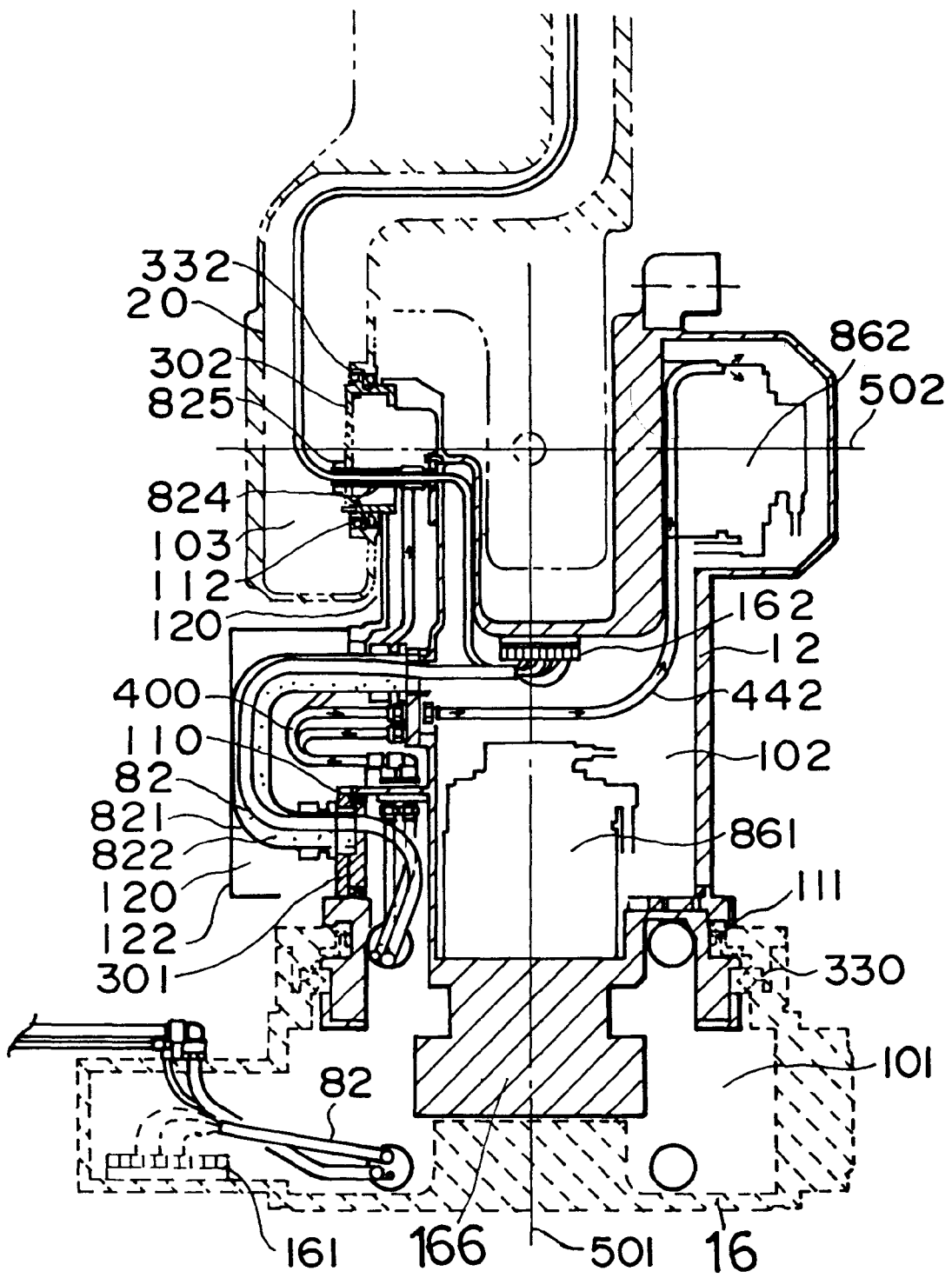
FIG. 5 is an enlarged cross-sectional rear-side view of FIG. 3 taken along line v—v of FIG. 2(b).
Figure 6:
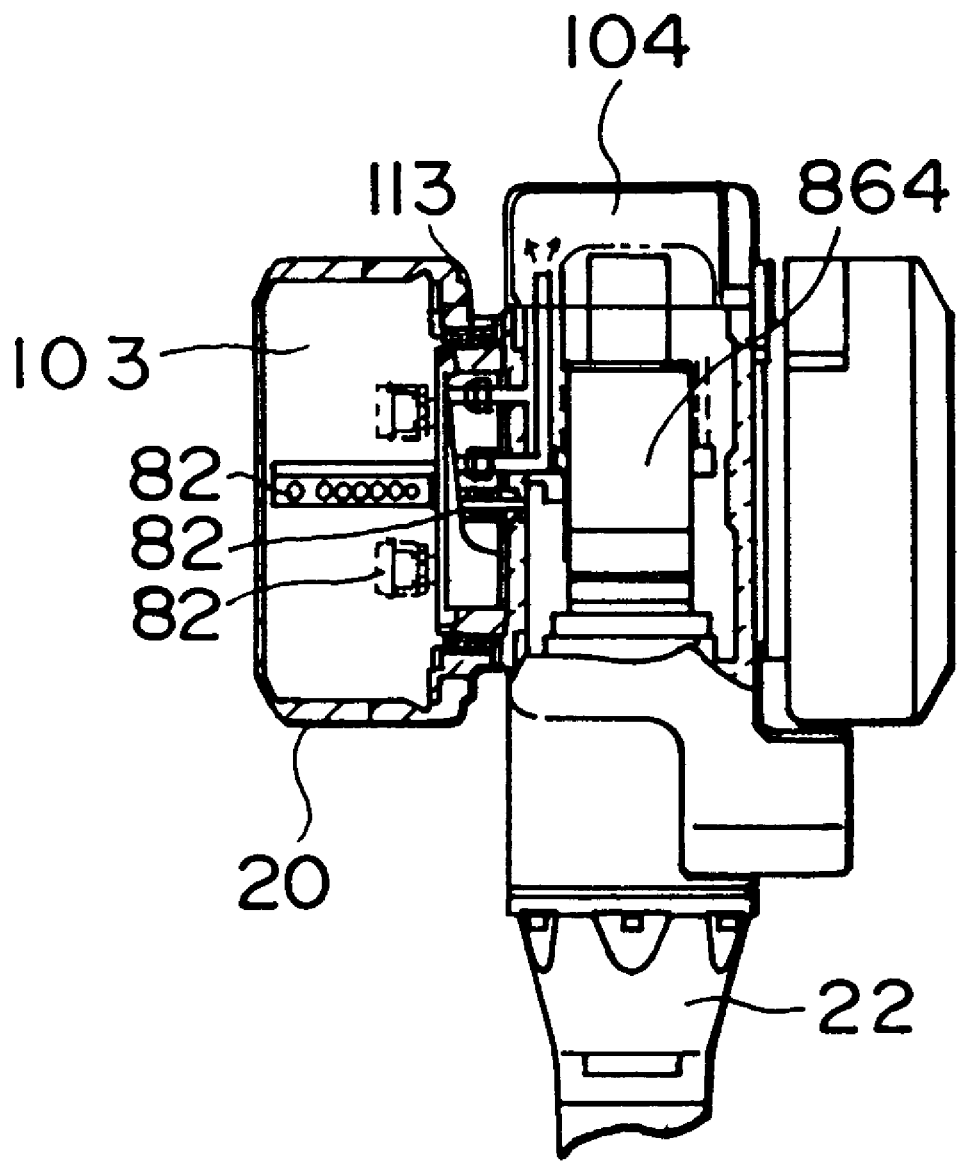
FIG. 6 is an enlarged cross-sectional view taken along line vi—vi of FIG. 2(b).

The electrically driven robot has a fixed base 16 having a first pressurized chamber 101. A rotary base 12 is supported rotatably relative to the base 16 around a vertical axis 501 (FIG. 5), and has a second pressurized chamber 102. As best seen in FIG. 5, the first pressurized chamber 101 is sealed by its metal wall, an outer lower metal wall of the rotary base 12, a sealed cover 301 and a circular oil seal 111, whereas the second pressurized chamber 102 is sealed by its metal wall. The oil seal 111 is disposed to keep the first pressurized chamber 101 hermetically sealed from the air or the hazardous environment. The first and second pressurized chambers 101 and 102 are not in fluid communication with each other. A space 120 provided between the first and second pressurized chambers and communicating with air or the hazardous environment has therein only a cover 122 for preventing external damage to an explosion-proof cable bundle 821 and air supply pipes 400 which are very little or substantially not exposed from the robot 1. The sealed cover 301 is a fixed sealing wall made detachable through bolts (not shown) and a seal 110 for maintenance and support of the explosion-proof cable bundle 821 through a sealing joint attached thereto.

Figures 7A, 7B:
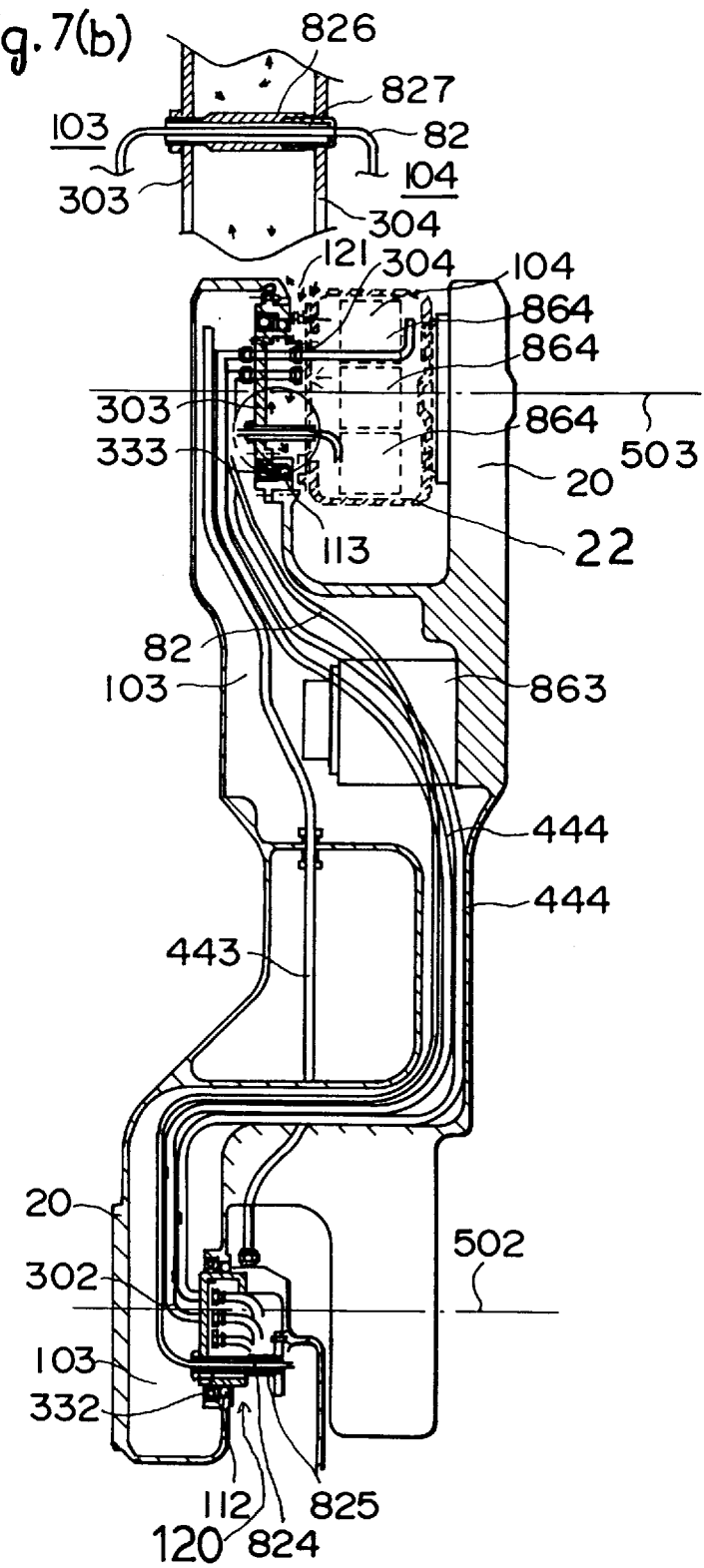
FIG. 7(a) is an enlarged sectional view taken along line vii—vii of FIG. 2(b)
FIG. 7(b) is a further enlarged sectional view of the upper circled part of FIG. 7(a).

The rotary base 12 is driven by an electric motor 861 disposed within the second pressurized chamber 102. A reduction gear unit 166 of the motor 861 is housed in the first pressurized chamber 101. An arm assembly comprises an inner arm 20 the lower end of which is supported rotatably around a first horizontal axis 502 (FIG. 5) relative to the rotary base 12, and an outer arm 22 one end of which is supported rotatably around a second horizontal axis 503 (FIG. 7(a)) relative to the inner arm 20. The inner arm 20 is driven by an electric motor 862 disposed within the second pressurized chamber 102, while the outer arm 22 is driven by an electric motor 863 provided within a third pressurized chamber 103 formed within the inner arm 20 (FIG. 7(a)). The third pressurized chamber 103 is sealed by its metal wall, rotatable sealed walls 302 and 303, and oil seals 112 and 113, whereas the fourth pressurized chamber 104 is sealed by its metal wall and a fixed sealed cover 304. The rotatable sealed walls 302 and 303 rotatable around the first and second horizontal axes 502 and 503(FIG. 7(a)) respectively are supported by bearings 332 and 333 and seals 112 and 113 in the inner arm wall. The rotatable sealed walls 302 and 303 support explosion-proof cable bundles 824 and 826 and air pipes 443 and 444 through sealing joints attached thereto(FIG. 7(a)). The second, third and fourth pressurized chambers 102, 103 and 104 are not in fluid communication with one another, rather, they are out of contact with one another through spaces 120 and 121 communicating with the air or the hazardous environment. A wrist 24 is rotatably mounted on the free end of the outer arm 22, and is driven by electric motors 864 provided within the fourth pressurized chamber 104 formed within the outer arm 22 and supports a painting gun (not shown).

The electric motors 861, 862, 863 and 864 each constituting the drive mechanism for the rotary base 12, the inner arm 20, the outer arm 22 and the wrist 24, are located in the three pressurized chambers 102, 103 and 104. Specifically, the first pressurized chamber 101 of the base 16 has the reduction gear unit 166 but has no electric motor for the drive mechanism of the rotary base 12. The second pressurized chamber 102 of the rotary base 12 has not only the electric motor 861 of the first drive mechanism for rotating the rotary base 12 around the vertical axis 501 (FIG. 5) relative to the base 16, but also the electric motor 862 of the second drive mechanism for driving the inner arm 20 back and forth around the horizontal axis 502 (FIG. 5) relative to the rotary base 12. The third pressurized chamber 103 provided within the inner arm 20 has the electric motor 863 of the third drive mechanism for driving the outer arm 22 up and down around the horizontal axis 503 (FIG. 7 (a)) relative to the inner arm 20. The fourth pressurized chamber 104 of the outer arm 22 has electric motors 864 of the fourth drive mechanism for driving the wrist around the three axes (not shown).

Explosion-proof cable bundles 30, 821, 824 and 826 each house cables 82 and are shielded by a steel tube. Further, the inside of each steel tube between the tube and the cables 82 is injected with sealing material 822, 825 and 827 to prevent the entry of air, and is not supplied with pressurized air. The explosion-proof cable bundle 30 extends from the robot controller 28 through the wall 26 provided between the non-hazardous environment and the hazardous environment to the wall of the first pressurized chamber 101 of the base 16. Cables 82 are electrically connected to a terminal strip 161 in the first pressurized chamber 101. The explosion-proof cable bundles 821, 824 and 826 extend respectively from the sealed cover 301 of the first pressurized chamber 101 to the lower wall of the second pressurized chamber 102, from the upper wall of the second pressurized chamber 102 to the rotatable sealed wall 302 of the third pressurized chamber 103, and from the rotatable sealed wall 303 of the third pressurized chamber 103 to the sealed cover 304 of the fourth pressurized chamber 104. Cables 82 are electrically connected to a terminal strip 162 in the second pressurized chamber 102 and to the respective motors 861, 862, 863 and 864.

Figure 4:
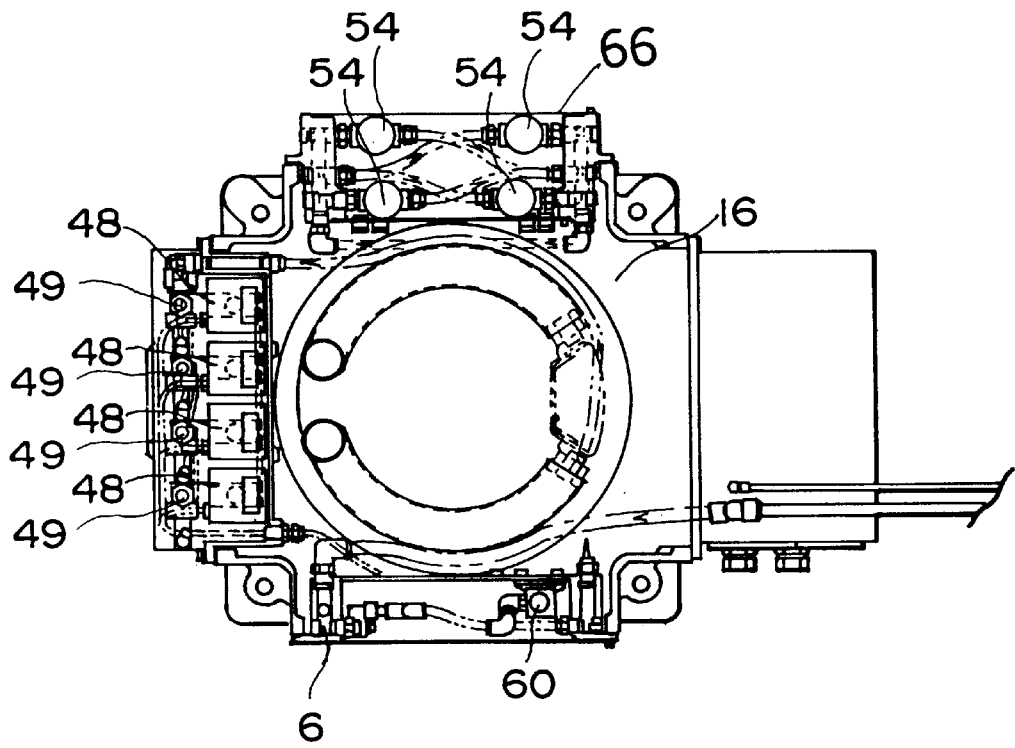
FIG. 4 is an enlarged cross-sectional view taken along line iv—iv of FIG. 2(b).

The four pressurized chambers 101, 102, 103 and 104 each have individual air supply pipes 44, 442, 443 and 444 the inside of which do not house cables, so that four air systems including four flow 54, four pressure switches 48 and four exhaust valves 49 (FIG. 4) are necessarily provided and are located outside of the first pressurized chamber 101. The air pipe 44 made of nylon the inside of which does not house cables supplies pressurized air from the air unit 118 located in the area having the environment containing non-inflammable gases to the first airtight or pressurized chamber 101 through the wall 26 and to a manifold 6 disposed therein having one output port communicating with the chamber 101. From the manifold 6 the three divided pressurized air pipes 442, 443 and 444 made of nylon the insides of which do not house cables extend through the wall 301 of the first airtight chamber 101 into the hazardous environment 120 and from there, respectively extends into the second, third and fourth chambers through the respective walls 302, 303 and 304 of the chambers, to feed pressurized air into the chambers 102, 103 and 104. Four air vent pipes (partly shown and the insides of which do not house cables) are provided from the pressurized chambers 101, 102,103 and 104 to a vent manifold 66 located outside of the first pressurized chamber 101 and to the four flow switches 54 fixed on the vent manifold 66, in parallel with the air supply pipes 400, 442, 443 and 444. One relief valve 60 located outside of the first pressurized chamber 101 is connected to the manifold 6. The four flow switches 54 respectively communicate with the four pressure switches 48 detecting the pressures of the respective chambers 101, 102, 103 and 104 and further are connected to the four exhaust valves 49 all located outside of the first pressurized chamber 101 and then exhausted into air. The exhaust valves 49 are adapted to operate by a preset pressure or an electric signal. Further, when the supply of air pressure from the air unit 118 to the pressurized chambers drops, the four flow switches 54 detect the drop and necessary measures are taken including raising the supply of; air pressure. Joints capable of keeping air tightness between the explosion-proof cable bundles 821, 824 and 826, air pipes 442, 443 and 444 and the pressurized chambers are used in each of the partition walls 301, 302, 303 and 304.

In operation, before the robot 1 is energized, pressurized air is supplied from the air unit 118 to the respective four pressurized chambers through the air pipe 44, the manifold 6 and the air pipes 400, 442, 443 and 444. Return air from the respective four pressurized chambers is exhausted into the air in the four air vent pipes, to the vent manifold 66, the four flow switches 54, the pressure switches 48 and to the exhaust valves 49. When the pressures detected by the respective pressure switches 48 all reach a preset pressure, the four exhaust valves 49 open to purge the air in the respective pressure chambers. After respective measured amounts of pressurized air, which are respectively computed to be a predetermined percentage of the volume of the respective pressurized chambers, are purged, the respective exhaust valves 49 are closed. The robot is then energized. During the time the robot is energized, each the pressure in each of the pressurized chambers is kept above the predetermined air pressure set by the pressure switches 48. When the air pressure in any one of the four pressurized chambers falls below the predetermined air pressure set by the pressure switches 48, one of the pressure switches 48 or flow switches 54 acts to stop the supply of electric power to the robot 1.

What is claimed is:

1. An electrically driven explosion-proof robot, comprising:
    a robot body having a plurality of pressurized chambers therein, said pressurized chambers not being in fluid communication with one another;
    a plurality of pipes for supplying pressurized air to each of said pressurized chambers, said pipes not carrying electrical cables therein; and
    a plurality of electric motors, each of said electric motors being located within a pressurized chamber and being supplied with electrical power via explosion-proof cable bundles.

2. An electrically driven explosion-proof robot as claimed in claim 1 which further comprises a plurality of switches for detecting the air pressure within said pressurized chambers, the supply of electrical power to said motors being interrupted when the pressure within a pressurized chamber falls below a predetermined amount.

3. An electrically driven explosion-proof robot as claimed in claim 1 which further comprises a plurality of sealing walls for keeping each chamber from fluid communication with another chamber.

4. An electrically driven explosion-proof robot as claimed in claim 1 which further comprises a cover supported by said robot body for reducing the exposure of at least a portion of said pipes to air outside of said robot body when interconnecting said pipes from one of said chambers to another.

5. An electrically driven explosion-proof robot, comprising:
    a fixed base;
    a rotary base rotatably supported relative to said fixed base for rotation about a vertical axis;
    an arm assembly including an inner arm and an outer arm, said inner arm having a lower end rotatably supported relative to said rotary base for rotation about a first horizontal axis, said outer arm having one end rotatably supported for rotation about a second horizontal axis relative to said inner arm;
    a plurality of pressurized chambers, not in fluid communication with one another, said pressurized chambers being distributed throughout said fixed base, said rotary base, and said arm assembly;
    a plurality of electric motors located within said plurality of pressurized chambers for driving said rotary base and said arm assembly;
    a plurality of pipes connected to said pressurized chambers for supplying pressurized air thereto, said pipes not carrying electrical power; and
    a plurality of switches for detecting the air pressure within said pressurized chambers, the supply of electrical power to said motors being interrupted when the pressure within a pressurized chamber falls below a predetermined amount.

6. An electrically driven explosion-proof robot as claimed in claim 5 wherein said plurality of pressurized chambers are located in said fixed base, said rotary base, said inner arm, and said outer arm respectively.

7. An electrically driven explosion-proof robot as claimed in claim 5 which further comprises a wrist, rotatably mounted on the other end of said outer arm, for supporting a paint gun.

8. An electrically driven explosion-proof robot comprising:
    a fixed base;
    a rotary base rotatably supported relative to said fixed base for rotation around a vertical axis;
    a first pressurized chamber contained within said fixed base;
    a second pressurized chamber contained within said rotary base;
    an inner arm having a lower end supported rotatably relative to said rotary base around a first horizontal axis;
    a third pressurized chamber contained within said inner arm;

an outer arm having an end supported rotatably relative to said inner arm around a second horizontal axis;

a fourth pressurized chamber contained within said outer arm;

four sealing walls, each separately covering said pressurized chambers, for hermetically sealing each chamber and keeping each said chamber from fluid communication with another chamber;

four electric motors, disposed within said second, third, and fourth pressurized chambers, and interconnected to cables for carrying electrical power and not carrying pressurized air;

a manifold, disposed within said first pressurized chamber, having one output port for supplying pressurized air to said first pressurized chamber and having three divided pipes not carrying any electrical power, extending through the sealing wall of said first pressurized chamber into the air and then extending into said other pressurized chambers separately, for supplying pressurized air to said other chambers;

a plurality of switches, interconnected to said pressurized chambers, for detecting the air pressure and air flow rates within each said chamber; and four explosion-proof cable bundles, containing the cables interconnected to said electrical motors, injected with a sealing material to prevent the entry of air into said cables, extending from said first chamber into said other chambers through said sealing walls, to supply electrical power to said electrical motors contained within said other chambers.

9. An electrically driven explosion-proof robot as claimed in claim 8 wherein:

the sealing walls of said third chamber are supported by bearings and seals, rotatable around said first and second horizontal axes respectively and allow passage of said explosion-proof cable bundles and said divided pipes through sealing joints attached thereto.

* * * * *